(12) United States Patent
Chou et al.

(10) Patent No.: US 8,116,324 B2
(45) Date of Patent: Feb. 14, 2012

(54) NETWORK RESOURCE ALLOCATION SYSTEM AND METHOD OF THE SAME

(75) Inventors: Cheng-Fu Chou, Taipei (TW); Ching-Ju Lin, Taipei (TW); Sung-Han Lin, Taipei (TW)

(73) Assignee: National Taiwan University, Taipei (TW)

( * ) Notice: Subject to any disclaimer, the term of this patent is extended or adjusted under 35 U.S.C. 154(b) by 685 days.

(21) Appl. No.: 12/338,068

(22) Filed: Dec. 18, 2008

(65) Prior Publication Data

US 2009/0268677 A1 Oct. 29, 2009

(30) Foreign Application Priority Data

Apr. 24, 2008 (TW) .............................. 97114983 A

(51) Int. Cl.
*H04L 12/28* (2006.01)
*H04L 12/50* (2006.01)
*H04H 20/71* (2008.01)
*H04J 3/06* (2006.01)

(52) U.S. Cl. ........ 370/400; 370/255; 370/312; 370/350; 370/384; 370/395.4

(58) Field of Classification Search ........................ None
See application file for complete search history.

(56) References Cited

U.S. PATENT DOCUMENTS

2003/0081603 A1 * 5/2003 Rune .............................. 370/390
2011/0038292 A1 * 2/2011 Salomone et al. ............. 370/311

* cited by examiner

*Primary Examiner* — Kwang B Yao
*Assistant Examiner* — Jutai Kao
(74) *Attorney, Agent, or Firm* — Peter F. Corless; Steven M. Jensen; Edwards Wildman Palmer LLP

(57) ABSTRACT

A network resource allocation system and method of the same are provided according to the present invention. The system and method are applicable to a wireless mesh network, the method including: programming traffic of connections between routers; exchanging data between neighboring routers, thereby enabling the routers to perform dispersive network resource allocation according to the exchanged data; checking a local time window and a global time window for expiration by the router; and, under the condition of local performance deterioration or local traffic variation, activating a local routing adjustment mechanism by the router, wherein, if global performance deterioration currently exists, then activating a global optimization mechanism by a central controller, and, if not, then resetting the global time window. Accordingly, the present invention is capable of perceiving the traffic status of each connection between routers, thereby efficiently directing traffic to various channels and wireless transceivers.

20 Claims, 4 Drawing Sheets

NETWORK RESOURCE ALLOCATION SYSTEM AND METHOD OF THE SAME

BACKGROUND OF THE INVENTION

1. Field of the Invention

This invention generally relates to a network resource allocation system and method of the same, and more specifically, to a network resource allocation system and method of the same that are capable of providing dynamically adjusted paths for enhancing the effective transmission rate of an overall wireless network system.

2. Description of Related Art

Along with developments in the third-generation (3G) cellular and wireless network industries, mobile web surfing has increased. WiMax is a rising wireless high-speed Internet access communication technology that provides an effective approach to broadband wireless service with respect to transmission distance, data transmission speed, and network setup costs. However, creating a reliable, win-win commercial model for both product providers and business owners has become an urgent issue to both members of the WiMax Forum and the telecommunications industry at large. In addition, with more and more private users using WiMax services, finding a way to provide a wider service scope to the public and fulfilling the demands of each customer group are both important issues worthy of attention.

There are two major prior techniques for establishing a wireless mesh network: one technique deals with path selection and channel allocation separately, wherein selection of less-utilized channels at each mesh network nodes is first performed, followed by securing transmission quality by considering bandwidth; and the other technique deals with both path selection and channel allocation concurrently.

With respect to the technique of dealing with path selection and channel allocation separately, two main methods exist: one method is characterized by selecting the less-utilized channel at each mobile node, and then adopting router considering bandwidth to secure transmission quality (see "Interference-Aware Topology Control and QoS Routing in Multi-Channel Wireless Mesh Networks" by J. Tang, G. Xue, and W. Zhang in MobiHoc '05, 2005); and the other method is characterized by adopting a strategy similar to dynamic source routing (DSR) that considers the factors of routing path length and channel multiplicity (see "Routing in Multi-radio, Multi-hop Wireless Mesh Networks" by R. Draves, J. Padhye, and B. Zill, in MobiCom '04, 2004). However, an interdependent relation exists between channel utilization and routing that has interferential influence on system performance. Therefore, these two factors must be considered concurrently.

With respect to the technique of dealing with both path selection and channel allocation concurrently, two main methods exist. One method suggests building up a tree-like architecture, and then adopting a non-stop circuit approach for reallocating channels and selecting routes, thus achieving the objective of higher network transmission efficiency (see "Architecture and Algorithms for an IEEE 802.11-based Multi-Channel Wireless Mesh Network" by A. Raniwala and T. Chiueh, in Proc. of IEEE Infocom, 2005). However, the tree-like architecture gives up a particular advantage of mesh networks which is that an interface is capable of receiving multiple wireless connections for increasing the network utilization rate. The other method deals with channel allocation and routing by means of linear programming (see "Joint Channel Assignment and Routing for Throughout Optimization in Multi-radio Wireless Mesh Networks" by M. Alicherry, R. Bhatia, and L. Li, in MobiCom '05 2005). However, although applying a linear programming technique improves system performance, it is incapable of quickly changing transmission modes in correspondence to variables such as routing errors, surrounding variations, and so on.

Hence, it is a highly urgent issue in the industry to provide a technique that is capable of improving wireless local area network quality and interferential influence, and further enhancing overall system performance and network transmission efficiency.

SUMMARY OF THE INVENTION

In view of the disadvantages of the prior art mentioned above, it is a primary objective of the present invention to provide a network resource allocation system that is capable of perceiving traffic of each network connection and then evenly directing the network load to a plurality of interfaces.

It is another objective of the present invention to provide a network resource allocation system that is capable of perceiving traffic of each network connection and then allocating the network load by using local routing information, wherein the system is applicable to various routing mechanisms.

It is a further objective of the present invention to provide a network resource allocation system that is capable of perceiving traffic of each network connection and then decreasing interference among various wireless network routers, thus improving efficiency.

Finally, it is a further objective of the present invention to provide a network resource allocation system that is capable of perceiving traffic of each network connection and then enhancing transmission efficiency of the overall wireless mesh network system.

To achieve the aforementioned and other objectives, a network resource allocation system applicable to a wireless mesh network is provided according to the present invention, wherein the wireless mesh network comprises a central controller having a global time window, gwnd, and a plurality of routers, each of the routers having a local time window, lwnd. The network resource allocation system comprises: a linear programming module, which is for programming network traffic of routers and each connection thereof, thereby enabling the overall transmission of the network system to achieve optimal routing allocation; a resource allocation module, which is for exchanging data with neighboring routers, thereby enabling the routers to perform dispersive network resource allocation based on the exchanged data, wherein the resource allocation module further comprises a wireless transceiver allocation module and a channel allocation module, in which the wireless transceiver allocation module is for evenly directing traffic of various wireless transceivers passing through each router, whereupon the routers then allocate the wireless transceivers having the least load for in and out traffic in accordance with the transmission direction, and the channel allocation module is for allocating orthogonal channels to various wireless transceivers for enhancing the channel usage rate after the wireless transceiver allocation module has distributed traffic; an indicator detection module, which is for checking on the local time windows and global time window for expiration of the routers after the resource allocation process, wherein, if the local time window has expired, then the router checks if network variation exists, including current local performance deterioration and local traffic variation, and, if the global time window has expired, then the central controller broadcasts a beacon to all routers, whereupon, after receiving the beacon, each router checks during the past local time window for routing path variation, whereupon, if a router discovers local performance deterioration occurred during the past local time window, then the router sends out a responding signal to the central controller; a local routing adjustment module, which is for activating a local routing adjustment mechanism when the indicator detection module detects local performance deterioration or local traffic variation, and for resetting the local time window if neither local performance deterioration nor local traffic variation is detected; and a global adjustment module, which is for examining if local performance deterioration exists currently when said indicator detection module detects that the global time window has expired and the central controller has received the responding signal sent from the router, in which, if yes, then the central controller activates a global optimization mechanism, and if not, then the global time window is reset.

The present invention further provides a network resource allocation method applicable to a wireless mesh network, wherein the wireless mesh network has a central controller having a global time window and a plurality of routers, in which each router has a local time window, the method being capable of perceiving traffic of each connection and then effectively directing traffic to various channels and wireless transceivers. The method comprises: first, programming traffic of the routers and the each connection thereof; next, exchanging data with neighboring routers, thereby enabling the routers to perform dispersive network resource allocation based on the exchanged data, wherein the resource allocation further comprises: evenly allocating traffic of various wireless transceivers passing through the routers, and then having the routers allocate wireless transceivers having the least load for in and out traffic, and, after evenly distributing traffic, allocating orthogonal channels to various wireless transceivers; subsequently checking on the local time windows and the global time window for expiration by the routers, wherein, if the local time window has expired, then the router further checks for network variations including current local performance deterioration and local traffic variation, and if the global time window has expired, then the central controller broadcasts a beacon to each of the routers, and upon receiving the beacon, each router promptly checks during the past local time window for routing path variation, and if the router discovers that local performance deterioration occurred during the past time window, then the router sends out a responding signal to the central controller, and furthermore, if local performance deterioration or local traffic variation is detected, then the router activates a local routing adjustment mechanism to dynamically adjust the routing path for dealing with the local performance deterioration, and then the local time window is reset, and if neither local performance deterioration nor local traffic variation is detected, then the local time window is reset; and upon detecting that the global time window has expired and the central controller receives the responding signal sent from the router, then determining if global performance deterioration is currently occurring, and if it is, then the central controller activates a global optimization mechanism, and if not, then the global time window is reset.

Compared with the prior art, the network resource allocation system and method of the present invention considers the relation between transmission and channel allocation on each wireless network connection, and is thereby capable of evenly distributing the load to each network resource, and then achieving higher overall transmission efficiency and impartiality. Meanwhile, the local routing adjustment mechanism provides a means to dynamically adjust routing paths for dealing with local performance deterioration. In other words, the local routing mechanism of the present invention is able to promptly perform actions corresponding to local traffic variations and path variations by simply using local traffic information.

BRIEF DESCRIPTION OF DRAWINGS

The present invention can be more fully understood by reading the following detailed description of the preferred embodiments, with reference made to the accompanying drawings, wherein.

DETAILED DESCRIPTION OF PREFERRED EMBODIMENTS

The following illustrative embodiments are provided to illustrate the disclosure of the present invention. Those in the art can readily understand these and other advantages and effects after reading the disclosure of this specification. The present invention can also be performed or applied in other differing embodiments. The details of the specification may be changed on the basis of different points and implementations, and numerous modifications and variations can be devised without departing from the spirit of the present invention.

Figure 1:
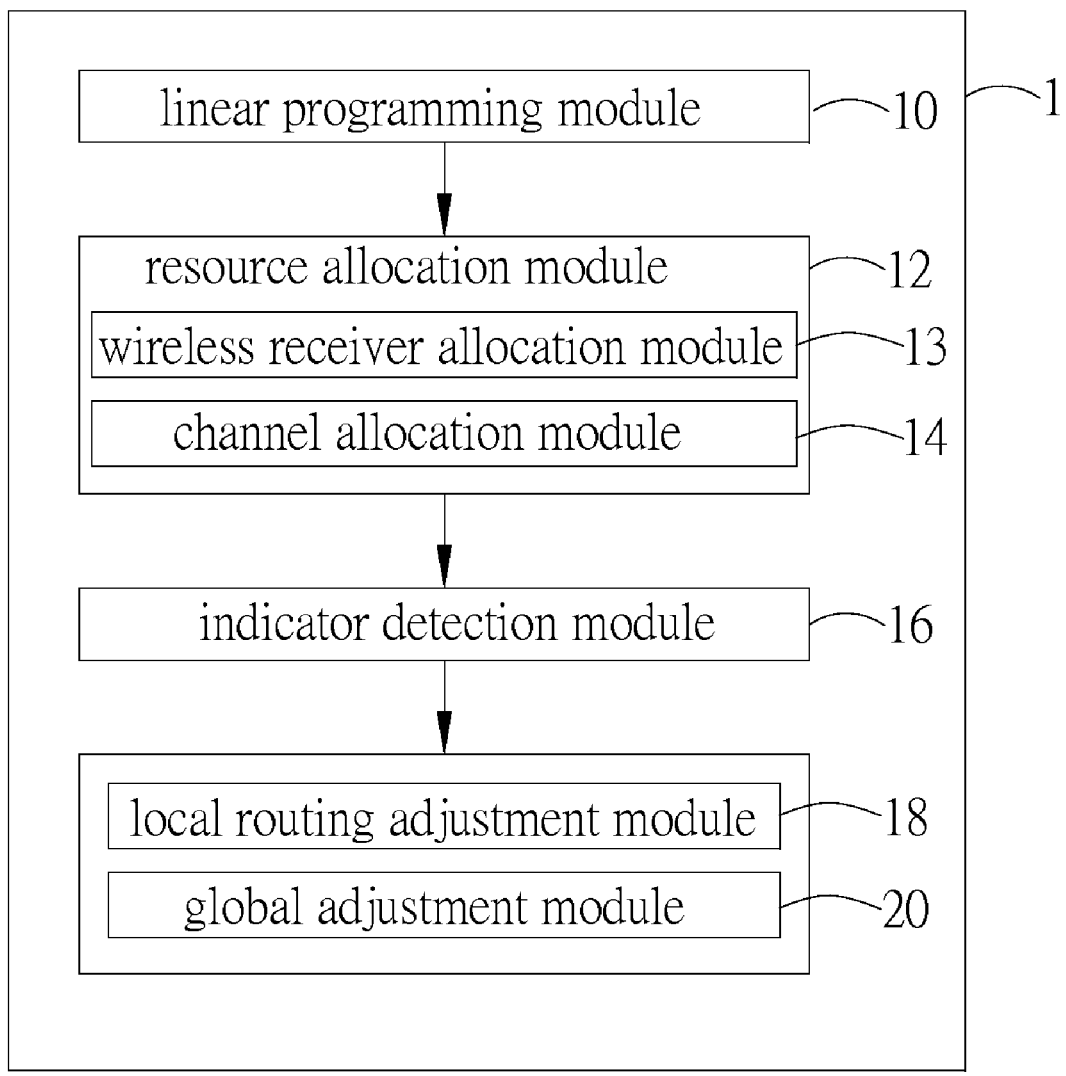
FIG. 1 is an architectural block diagram illustrating the network resource allocation system of the present invention.

Referring to FIG. 1, an architectural block diagram illustrating the network resource allocation system of the present invention is shown. The network resource allocation system of the present invention is applicable to a wireless mesh network. The wireless mesh network has channels, wireless transceivers, a central controller with a global time window, and routers with local time windows. The network resource system of the present invention 1 is capable of effectively directing traffic to various channels and wireless transceivers while perceiving traffic situation of each connection of the network. As shown in the figure, the dispersive multimedia access system 1 comprises: a linear programming module 10; a resource allocation module 12 comprising a wireless transceiver allocation module 13 and a channel allocation module 14; an indicator detection module 16; a local routing adjustment module 18; and a global adjustment module 20.

In a wireless mesh network, each router has concurrent transmission demands to a plurality of routers or gateways and linear programming can be used to provide optimal route programming. The linear programming module 10 is for programming the traffic of the routers and each connection thereof, thereby enabling the overall transmission of the wireless mesh network to achieve optimal routing allocation.

However, in order to enable the overall transmission of the wireless mesh network to achieve optimal route allocation, the following four conditions must be fulfilled: (1) traffic passing through a router cannot be greater than the entire traffic supportable by all wireless transceivers of the router; (2) in traffic and out traffic of the router must be equal; (3) each group of traffic should be treated impartially such that it has the same transmission success rate as any other group; and (4) high transmission success rates for the transmission demands of each router must be worked out, thereby making it possible to increase overall traffic successfully transmitted.

After a programming process is performed by said linear programming module 10, the resource allocation module 12 is used for exchanging data with neighboring routers, thereby enabling the routers to perform dispersive network resource allocation. The resource allocation module 12 further comprises a wireless transceiver allocation module 13 and a channel allocation module 14. The wireless transceiver allocation module 13 is for evenly allocating traffic of various wireless transceivers passing through the routers. In other words, in order to prevent transmission between two connected hops from being interrupted, in traffic and out traffic must first pass through different wireless transceivers assigned with different channels, wherein the router will allocate the wireless transceivers having the least load for the in traffic and out traffic in accordance with the transmission direction. The channel allocation module 14 is for, after the wireless transceiver allocation module 13 has distributed traffic, allocating orthogonal channels to different wireless transceivers for enhancing the channel usage rate. Specifically, after allocating wireless transceivers to through traffic, a wireless transceiver will have various traffic packets passing through concurrently, and also different wireless network connections will adopt different channels that don't disturb one another, thereby securing higher bandwidth traffic.

Note that channel allocation performed by said channel allocation module 14 is restricted by the two following factors: channel dependence and the number of channels. Channel dependence means that while using the same wireless transceiver, the same channel must be adopted; therefore, in the process of finding all channel-dependent wireless transceivers, first, a wireless transceiver is acquired by continuously cyclically checking an unchecked queue of wireless transceivers, and removing any wireless transceiver that is communicating with the router via the acquired wireless transceiver from all queues to the unchecked queue of wireless transceivers, and then putting the acquired wireless transceiver into a newly generated assembly of channel-dependent wireless transceivers, and then repeating said steps until the unchecked queue of wireless transceivers is empty. The number of channels factor means that the applied channel number cannot be greater than the maximum available channel number. If the applied channel number is greater than the maximum available channel number, then two different channel assemblies are combined until the applied channel number is equal to the maximum available channel number, wherein, while selecting the channels to combine, the least-loaded channel among all channels is selected to make the combination.

After the process of resource allocation, said indicator detection module 16 is for checking on the local time window and the global time window for expiration via the routers. If the local time window has expired, then the router further checks for network variation, including current local performance deterioration and local traffic variation. If the global time window has expired, then the central controller broadcasts a beacon to each router, and, upon receiving the beacon, each router checks for routing path variation during the local time window, preferably checking routing path variation at several times during the time window, for example, checking three times during the past local time window. If the router detects that local performance deterioration has occurred during the past local time window, then, subsequently, the router sends out a responding signal to the central controller, wherein the local time window is an indicator adopted by each router for controlling and activating the local routing adjustment mechanism, and the global time window is an indicator adopted by the central controller for controlling and activating the global optimization mechanism. Also, one of gateways has central controller.

When said indicator detection module 16 detects local performance deterioration or local traffic variation, the local routing adjustment module 18 is for activating the local routing adjustment mechanism by the router to dynamically adjust routing in response to local network performance deterioration. Actions are performed corresponding to local traffic variation and route variation by using only local information. Subsequently, the local time window is reset. However, if neither local performance deterioration nor local traffic variation is detected, then the local time window is directly reset.

However, since altering channel allocation will break off connections between channel-dependent network wireless transceivers, and further cause network disconnection, it is to be noted that during the local time window, the router will adjust the routing path only and not alter channel allocation. Therefore, during the local time window, at least hypothetically, each mesh node is able to ascertain routing paths capable of reaching the intended destination by using a reactive flooding mechanism, and then selecting a preferable path to perform as a substitute path when the default path is problematic. Of course, for a preferable path selection, the fewer mesh nodes, the better; and also it's better if each mesh node is not heavily loaded. But such is not always possible. Accordingly, compared with a path having the least number of mesh nodes where each of the mesh nodes is heavily loaded, the invention typically chooses a path with more mesh nodes where each mesh node is less loaded. A routing metric, named Local Minimal Interface (LMI), is adopted for describing the situation, wherein the local routing adjustment module 18 performs a process of path selection by adopting the LMI for measuring potential interferential influence of a path, and also for determining the path with the least maximum interferential influence and higher peer-to-peer transmission performance. The Local Minimal Interface is expressed by following equation:

$$LMI = \alpha * TLoad + (1 - \alpha)BLoad$$

wherein $$TLoad = k * d \text{ and}$$

$$BLoad = \max_{0 \le i \le k} \left( n_i \cdot intf + \sum_{j=i-(q+1)}^{i+(q+1)} I(e_j \cdot ch = e_i \cdot ch) * d \right)$$

Wherein, TLoad is the total traffic handled by the wireless mesh network, wherein TLoad is for examining how to reduce the total traffic handled by the network mesh network; and BLoad is for examining how to minimize interference to the wireless mesh network caused by the path, wherein BLoad is capable of evaluating interference caused by each interface, and then evenly assigning the load of each interface.

Meanwhile, in the TLoad equation, if d indicates traffic to be transmitted, and k is mesh node number of the transmission path, then k*d indicates the total traffic of the wireless mesh network transmission, wherein, when the transmission passes through more connections, the traffic load gets heavier, consequently increasing interference within the wireless mesh network, and, in addition, causing higher network delay if the transmission travels through a longer path.

On the other hand, in the BLoad equation, if q indicates hops, then in a local adjustment stage, each router will send a Hello Message to neighbors within a distance of q+1 hops when the local time window thereof has expired. The content of the Hello Message includes the traffic demand of the router during the local time window and information on how the channel is applied by each network interface. Each router receives signals transmitted from neighbors thereof within q+1 hops, and also the interferential influence is calculated caused by each network interface of the router while transmitting traffic. In addition, BLoad also examines the size of the total traffic of connections formed by network interfaces sharing the same channel among neighbors within q+1 hops in distance, wherein, BLoad is capable of estimating the interference contributed by each interface, and then enabling each interface to take an equal load.

In view of the above, the LMI is for weighing the influence brought by TLoad and BLoad, and then giving a proper weight, wherein a smaller LMI means that a higher overall traffic is obtainable.

When said indicator detection module 16 detects that the global time window has expired and also that the central controller receives the responding signal sent from the router, the global adjustment module 20 promptly evaluates if the global performance deterioration currently exists, wherein, if yes, then the central controller activates the global optimization mechanism, and otherwise, the global time window is reset.

Figure 2:
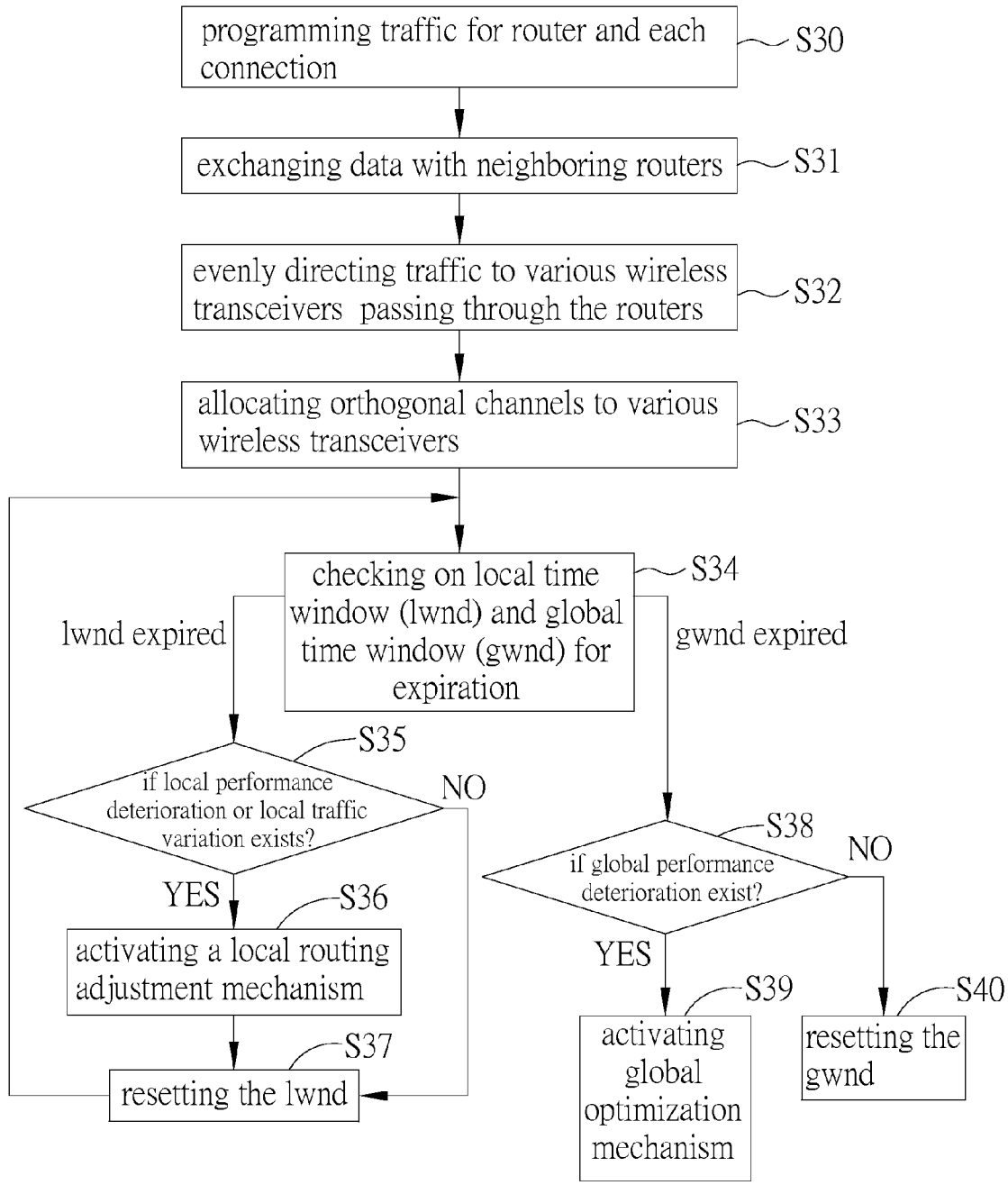
FIG. 2 is a flowchart illustrating the operational flow of the network resource allocation method of the present invention.

FIG. 2 is a flowchart illustrating the flow operation of network resource allocation method of the present invention. The method is applicable to a wireless mesh network, wherein the wireless mesh network comprises channels, wireless transceivers, a central controller having a global time window, and routers having local time windows. The method is capable of perceiving traffic of each connection of the network, and then directing traffic to various channels and wireless transceivers, the method comprising the following steps:

In step S30, programming traffic of the routers and each of the connections thereof, thereby enabling overall transmission of the wireless mesh network to achieve optimal path allocation; next, proceeding to step S31.

In step S31, after programming traffic of the routers and each of the connections, allocating some connections for assisting other transmission demands, and also having each router perform network resource allocation based on uploading/downloading transmission demands, and then exchanging data with neighboring routers, thereby enabling the routers to perform dispersive network resource allocation based on the exchanged data; next, proceeding to step S32.

In step S32, evenly directing traffic passing through various wireless transceivers of the router, wherein the router will allocate the wireless transceivers having the least load for in and out traffic in accordance with the transmission direction; next, proceeding to step S33.

In step S33, after evenly directing the traffic, allocating orthogonal channels to various wireless transceivers, thereby enhancing the channel usage rate; next, proceeding to step S34.

In step S34, after said resource allocation, checking on the local time window and the global time window for expiration via the routers, wherein, if the local time window has expired, then proceeding to step S35, and if the global time window has expired, then proceeding to step S38.

In step S35, checking on network variation by the router, including local performance deterioration and local traffic variation, wherein, if local performance deterioration or local traffic variation exists, then proceeding to step S36, and if not, then proceeding to step S37.

In step S36, activating a local routing adjustment mechanism by the router, which involves dynamically adjusting the path to counteract local network performance deterioration and performing action corresponding to local traffic variation and path variation by simply using local information; next, proceeding to step S37.

In step S37, resetting the local time window.

In step S38, broadcasting a beacon to all of the routers by the central controller, wherein, upon receiving the beacon, each router checks for path variation during the past local time window, preferably checking at multiple times, such as three times during the past local time window, in which, if the router detects local performance deterioration occurred during the past local time window, the router sends out a responding signal to the central controller, and, if the global time window has expired and also the central controller receives the responding signal sent from the router, promptly evaluating if global performance deterioration currently exists, wherein, if yes, then proceeding to step S39, and if not, proceeding to step S40.

In step S39, activating the global optimization mechanism by the central controller; next, proceeding to step S40.

In step S40, resetting the global time window.

Figure 4:
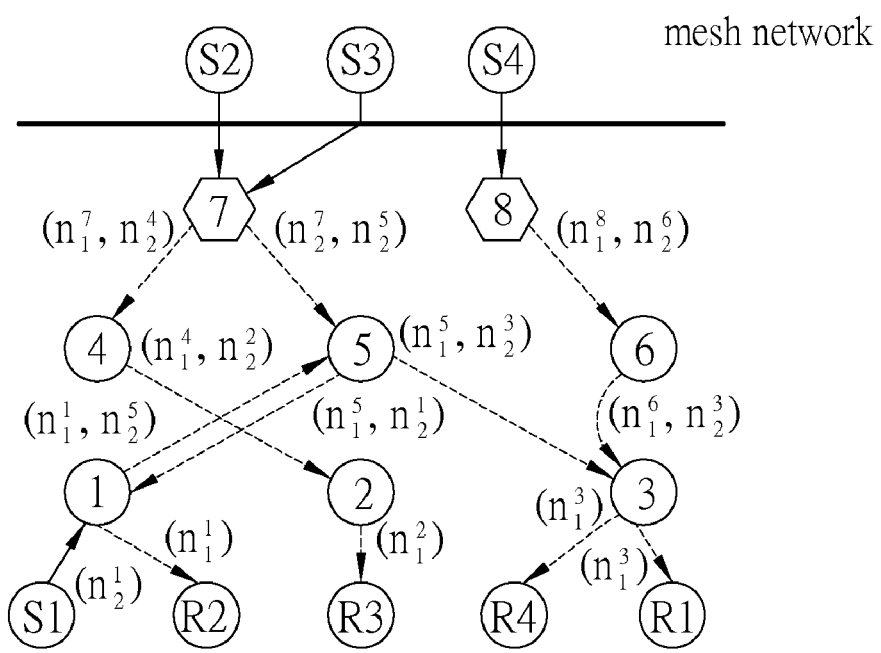
FIG. 4 is a diagram illustrating an embodiment of adjusting wireless transceiver traffic allocation of routing perception resource allocation according to the network resource allocation system and method of the present invention.
Figure 5:
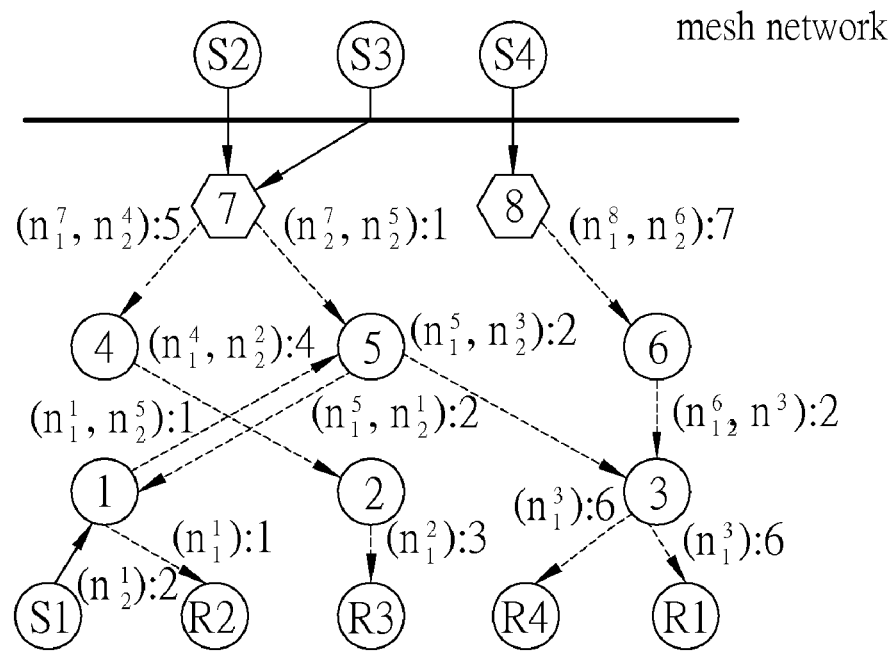
FIG. 5 is a diagram illustrating an embodiment of adjusting channel dependence of routing perception resource allocation according to the network resource allocation system and method of the present invention.
Figure 6:
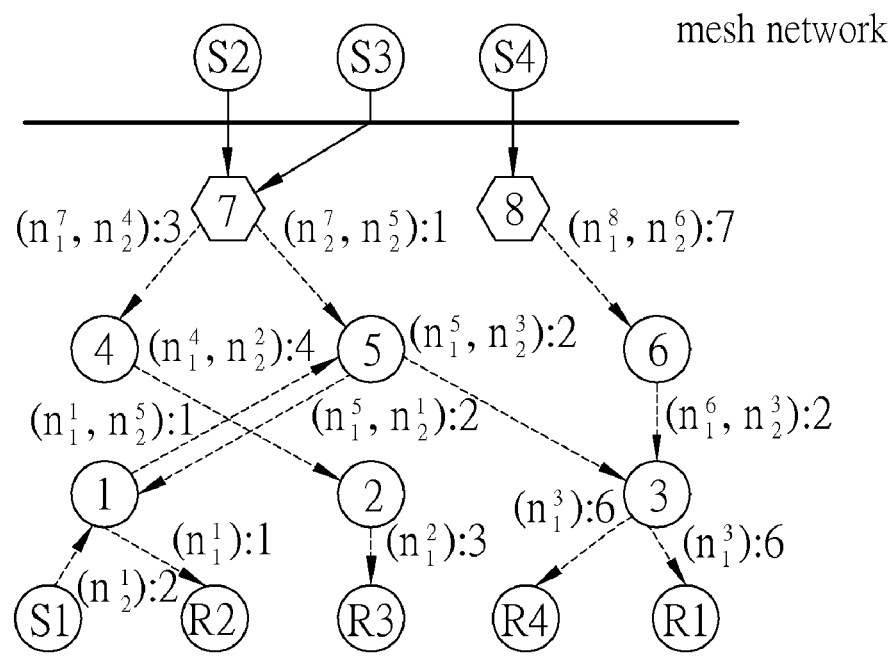
FIG. 6 is a diagram illustrating an embodiment of adjusting the channel number of routing perception resource allocation according to the network resource allocation system and method of the present invention.

In order to enable those in the art to comprehend the implementation mode of the network resource allocation system and method of the present invention, the following detailed descriptions of the embodiments depicted by FIGS. 4 through 6 are provided.

Figure 3:
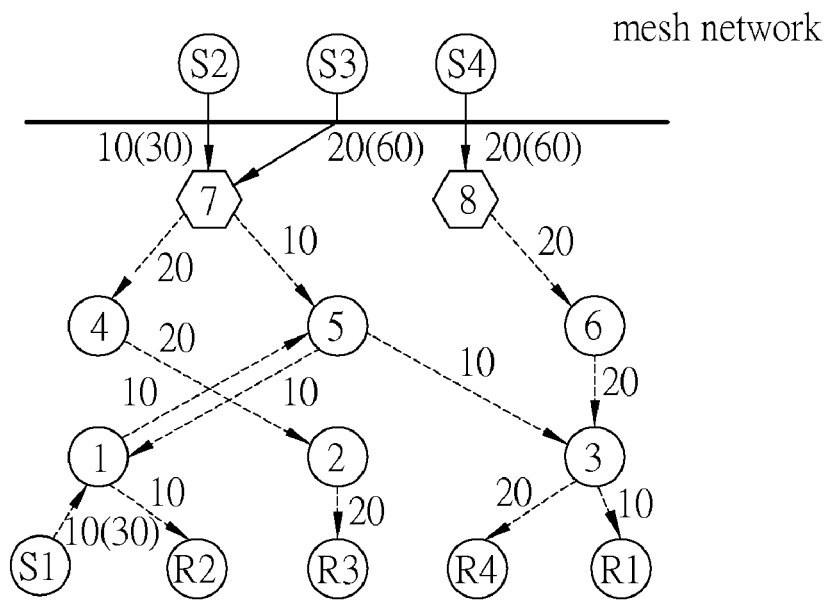
FIG. 3 is a diagram illustrating an embodiment of linear programming routing of the network resource allocation system and method of the present invention.

FIG. 3 illustrates a first embodiment of linear programming routing of network resource allocation according to the network resource allocation system and method of the present invention. The figure depicts eight mesh routers, wherein routers 7 and 8 are gateways and each router has two wireless transceivers with a maximum bandwidth of 30 units of data; router 1 has a 30-unit transmission demand to router 3 and a 30-unit transmission demand from the gateway; and router 2 and router 3 have 60-unit transmission demands from the gateways. By means of linear programming routing, we can get all routers to assist in transmitting a maximum of one-third of the transmission demand, wherein, after acquiring traffic routing path, the acquired information can be used to perform routing-perceived resource allocation.

FIG. 4 illustrates one embodiment of wireless transceiver traffic allocation according to the network resource system and method of the present invention illustrating the outcome of the routing-perceived resource allocation. As shown in the figure, $(n_i^u, n_j^v)$ indicates an established connection between wireless transceiver i of router u and wireless transceiver j of router v. For example, $(n_1^1, n_2^5)$ in the figure indicates that traffic passes through wireless transceiver 1 of router 1 and wireless transceiver 2 of router 5.

After the process of wireless transceiver allocation, a subsequent step is to assign a communicating channel to the wireless transceivers, wherein all of the connected wireless transceivers use the same channel.

FIG. 5 illustrates one embodiment of channel dependence of the network resource allocation system and method of the present invention. As shown in the figure, router 5 has only two wireless transceivers, one wireless transceiver is for in traffic and the other wireless transceiver is for out traffic. Consequently, traffic from router 5 to router 1 and router 3 should share the same channel. In particular, $n_2^1, n_1^5, n_2^3$ should share the same channel. In addition, router 6 to router 3 uses $n_2^3$. Therefore, according to channel dependence, $n_2^1$, $n_1^6, n_2^3, n_1^6$ all share the same channel. In the figure, there are seven sets of channel-dependent wireless transceiver assemblies. For example, channel 5 is for the assembly of $\{n_1^7, n_2^4\}$. Also, since the available number of channels is less than 7, some assemblies should be combined to share the same channel.

FIG. 6 illustrates one embodiment of adjusting the channel number of routing perception resource allocation according to the network resource allocation system and method of the present invention. FIG. 6 illustrates the outcome of combining two assemblies for sharing the same channel. As shown in the figure, since combining the assembly using channel 5 and assembly channel 3 causes less interference, these two assemblies are combined. After the process of combining, the assembly originally using channel 5 is switched to channel 3, and the combining process is continued until the restriction of the number of channels is satisfied.

In summary, the network resource allocation system and method of the present invention is capable of perceiving traffic of each network connection, and then efficiently assigning traffic to various channels and wireless transceivers. Compared with the prior approach that doesn't consider data transmission on the various connections, the present invention is capable of evenly distribution load to each network resource, thus achieving a higher overall transmission efficiency and impartiality. Meanwhile, it dynamically adjusts the routing path by adopting a local routing adjustment mechanism to deal with local performance deterioration. In other words, the local routing adjustment mechanism requires only local traffic information for promptly performing actions corresponding to local traffic variation and routing variation. Therefore, the network resource allocation system and method of the present invention are capable of effectively and accurately directing traffic to various channels and wireless transceivers, consequently reducing interferential influence among wireless signals, and further achieving higher network transmission efficiency, while dealing with the influence brought by traffic variations by simply adjusting local allocation.

The foregoing descriptions of the detailed embodiments are only illustrated to disclose the features and functions of the present invention and are not restrictive of the scope of the present invention. It should be understood by those in the art that various modifications and variations can be devised according to the spirit and principle in the disclosure of the present invention and yet still fall within the scope of the invention as revealed in the appended claims.

What is claimed is:

1. A network resource allocation system, which is applicable to a wireless mesh network, the wireless mesh network consisting of channels, wireless transceivers, a central controller having a global time window, and routers having local time windows, the network resource allocation system comprising:
    a linear programming module, which is for programming network traffic of the routers and each network data connection thereof, thereby enabling overall traffic of the wireless mesh network to achieve maximum optimal routing allocation;
    a resource allocation module, which, after a programming process performed by the linear programming module, is for exchanging data with neighboring routers, thereby enabling the routers to process dispersive network resource allocation based on the exchanged data;
    an indicator detection module, which, after a process of network resource allocation, is for checking on the local time windows and the global time window for expiration by the router, wherein, if the local time window has expired, then the router further checks for network variation including current local performance deterioration and local traffic variation, and, in addition, if the global time window has expired, then the central controller broadcasts a beacon to each of the routers, whereupon, after receiving the beacon, each router promptly checks for routing path variation during the past local time window, and if the router detects that local performance deterioration occurred during the past local time window, the router sends a responding signal to the central controller;
    a local routing adjustment module, wherein, if the indicator detection module detects local performance deterioration or local traffic variation, the local routing adjustment module subsequently activates a local routing adjustment mechanism to dynamically adjust routing paths directed against the local performance deterioration, and also performs actions directed against local traffic variation and path variation by using local information and also subsequently resetting the local time window; and, if neither local performance deterioration nor local traffic variation is detected, then the local routing adjustment module simply causes the local time window to be reset; and
    a global adjustment module, which is applicable when the indicator detection module detects that the global time window has expired and the central controller receives a responding signal from the router, whereupon the global adjustment module promptly evaluates if global performance deterioration is currently happening, wherein, if it is happening, then the central controller instantly activates a global optimization mechanism; and, if it is not happening, the global adjustment module causes the global time window to be reset.

2. The network resource allocation system of claim 1, wherein the resource allocation module comprises:
    a wireless transceiver allocation module, which is for evenly distributing traffic of various wireless transceivers passing through the router, wherein the router allocates the wireless transceivers having the least load for in and out traffic in accordance with the transmission direction; and
    a channel allocation module, which is applicable after the wireless transceiver allocation module has distributed traffic, allocating orthogonal channels to various wireless transceivers, thereby enhancing the channel usage rate.

3. The network resource allocation system of claim 1, wherein, upon each router receiving the beacon, each router promptly checks for routing path variation for the past three local time windows.

4. The network resource allocation system of claim 1, wherein the global time window is utilized by the central controller as an indicator for controlling and activating the global optimization mechanism.

5. The network resource allocation system of claim 1, wherein the local time window is utilized by each router as an indicator for controlling and activating the local routing adjustment mechanism.

6. The network resource allocation system of claim 1, wherein the central controller is disposed in a gateway.

7. The network resource allocation system of claim 1, wherein the channel allocation module has limitations while performing channel allocation, the limitations comprising:
channel dependence, which means that while using the same wireless transceiver, the same channel must be used; therefore, in order to find all channel-dependent wireless transceivers, a wireless transceiver is acquired by means of continuously cyclically checking on an unchecked queue of wireless transceivers, and also taking out any wireless transceiver that is communicating with the router via the acquired wireless transceiver from all queues, and then putting it in the unchecked queue of wireless transceivers, and subsequently putting the acquired wireless transceiver into a newly generated assembly of channel-dependent wireless transceivers, and repeating said steps until the unchecked queue of wireless transceivers is empty; and
number of channels, which means the applied channel number cannot be greater than the maximum available channel number, wherein, if the applied channel number is greater than the maximum available channel number, then two different channel assemblies are combined until the applied channel number is equal to the maximum available channel number.

8. The network resource allocation system of claim 7, wherein, while combining two different channel assemblies, the maximum least-load channels among all channels are selected to make the combination.

9. The network resource allocation system of claim 1, wherein, the local routing adjustment module selects a path by adopting a Local Minimal Interface (LMI) for measuring potential interferential influence of a routing path, and then determining a path having the least maximum interferential influence and higher peer-to-peer transmission performance, wherein the Local Minimal Interface is expressed by the following equation:

$$LMI = \alpha * TLoad + (1 - \alpha)BLoad$$

wherein $$TLoad = k * d \text{ and}$$

$$BLoad = \max_{0 \le i \le k} \left( n_i \cdot intf + \sum_{j=i-(q+1)}^{i+(q+1)} I(e_j \cdot ch = e_i \cdot ch) * d \right)$$

wherein,
TLoad is the total traffic brought to the wireless mesh network, and TLoad is for examining how to reduce the overall traffic brought to the wireless mesh network; and
BLoad is for determining the configuration of least interference to the wireless mesh network caused by the path; in other words, BLoad is for evaluating interference caused by each interface, and then evenly directing the load to each interface.

10. The network resource allocation system of claim 9, wherein the LMI is for weighing influence brought by TLoad and BLoad, and then providing a proper weight, and wherein smaller LMI means that a higher overall traffic rate is obtainable.

11. The network resource allocation system of claim 9, in which, in the TLoad equation, if d indicates traffic to be transmitted, and k indicates the mesh node number of the transmission path, then k*d indicates the overall traffic transmitted to the wireless mesh network, wherein, when the transmission passes through more connections, the traffic load gets heavier, consequently increasing interferential influence within the wireless mesh network.

12. The network resource allocation system of claim 9, wherein, in the BLoad equation, if q indicates hops, then in a local adjustment stage, each router will send a Hello Message to its neighbors within a distance of q+1 hops when the local time window thereof is expired, in which the content of the Hello Message includes the traffic demand of the router during the local time window and information on the channel applied by each network interface, wherein each router receives signals transmitted from neighbors thereof within q+1 hops, and the interferential influence caused by each network interface of the router while transmitting traffic is also calculated.

13. The network resource allocation system of claim 12, wherein BLoad also studies the size of the total traffic of connections formed by network interfaces sharing the same channel among neighbors within q+1 hops in distance.

14. A network resource allocation method, which is applicable to a wireless mesh network, wherein the wireless mesh network consists of channels, wireless transceivers, a central controller having a global time window, and routers having local time windows, the network resource allocation method comprising:
programming traffic of the routers and each connection thereof, thereby enabling the overall traffic of the wireless mesh network to achieve maximum optimal routing allocation;
enabling each router to exchange data with other neighboring routers, thereby enabling the routers to process dispersive network resource allocation based on the exchanged data;
checking on the local time window and the global time window for expiration by the router, in which, if the local time window has expired, then the router further checks for network variation including current local performance deterioration and local traffic variation, wherein, if the global time window has expired, then the central controller broadcasts a beacon to each of the routers, whereupon, after receiving the beacon, each router promptly checks for routing path variation during the past local time window, and if the router detects that local performance deterioration has occurred during the past local time window, the router sends a responding signal to the central controller;
activating a local routing adjustment mechanism by the router if local performance deterioration or local traffic variation is detected, and then dynamically adjusting the routing path directed against the local performance deterioration, and also performing actions directed against local traffic variation and path variation by using local information, and subsequently resetting the local time window; and, if neither local performance deterioration nor local traffic variation is detected, then resetting the local time window; and
promptly evaluating if global performance deterioration is currently happening when expiration of the global time window is detected and the central controller receives the responding signal from the router, wherein, if yes, then the central controller instantly activates a global optimization mechanism, and if not, then the global time window is reset.

15. The network resource allocation method of claim 14, wherein resource allocation comprises:
   evenly distributing traffic of various wireless transceivers passing through the router, wherein the router allocates the wireless transceivers having the least load for in and out traffic in accordance with the transmission direction; and
   allocating orthogonal channel to various wireless transceivers after evenly distributing traffic, thereby enhancing channel usage rate.

16. The network resource allocation method of claim 14, wherein the router checks for routing path variation for the past three local time windows.

17. The network resource allocation method of claim 14, wherein a channel allocation module has limitations while performing channel allocation, the limitation comprising:
   channel dependence, which means that while using the same wireless transceiver, the same channel must be used; therefore, in order to find all channel-dependent wireless transceivers, a wireless transceiver is acquired by means of continuously cyclically checking on an unchecked queue of wireless transceivers, and also taking out any wireless transceiver that is communicating with the router via the acquired wireless transceiver from all queues, and then putting it in the unchecked queue of wireless transceivers, and subsequently putting the acquired wireless transceiver into a newly generated assembly of channel-dependent wireless transceivers, and repeating said steps until the unchecked queue of wireless transceivers is empty; and
   number of channels, which means the applied channel number cannot be greater than the maximum available channel number, wherein, if the applied channel number is greater than the maximum available channel number, then two different channel assemblies are combined until the applied channel number is equal to the maximum available channel number.

18. The network resource allocation method of claim 17, wherein while combining two different channel assemblies, the maximum least-load channels among all channels are selected to make the combination.

19. The network resource allocation method of claim 14, wherein, a local routing adjustment module selects a path by adopting a Local Minimal Interface (LMI) for measuring potential interferential influence of a routing path, and then determining a path having the least maximum interferential influence and higher peer-to-peer transmission performance, wherein the Local Minimal Interface is expressed by the following equation:

$$LMI = \alpha * TLoad + (1 - \alpha)BLoad$$

wherein $$TLoad = k * d \text{ and}$$

$$BLoad = \max_{0 \le i \le k} \left( n_i \cdot intf + \sum_{j=i-(q+1)}^{i+(q+1)} I(e_j \cdot ch = e_i \cdot ch) * d \right)$$

wherein,
TLoad is the total traffic brought to the wireless mesh network, and TLoad is for examining how to reduce the overall traffic brought to the wireless mesh network; and
BLoad is for determining the configuration with least interference to the wireless mesh network caused by the path; in other words, BLoad is for evaluating interference caused by each interface, and then evenly directing the load to each interface.

20. The network resource allocation method of claim 19, wherein the LMI is for weighing the influence brought by TLoad and BLoad, and then providing a proper weight, wherein a smaller LMI means that a higher overall traffic is obtainable.

* * * * *